United States Patent
Bulekbay et al.

(10) Patent No.: US 10,961,433 B2
(45) Date of Patent: Mar. 30, 2021

(54) HYDROCARBON WELL DELIQUIFICATION USING DRY ICE

(71) Applicant: Saudi Arabian Oil Company, Dhahran (SA)

(72) Inventors: Aslan Bulekbay, Udhailiyah (SA); Prasad Baburao Karadkar, Al-Khobar (SA); Mustafa Alkhowaildi, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 179 days.

(21) Appl. No.: 16/275,474

(22) Filed: Feb. 14, 2019

(65) Prior Publication Data

US 2020/0263079 A1  Aug. 20, 2020

(51) Int. Cl.
*E21B 43/12* (2006.01)
*C09K 8/588* (2006.01)

(52) U.S. Cl.
CPC ............ *C09K 8/588* (2013.01); *E21B 43/122* (2013.01)

(58) Field of Classification Search
CPC .............................. C09K 8/588; E21B 43/122
See application file for complete search history.

(56) References Cited

U.S. PATENT DOCUMENTS

| | | | |
|---|---|---|---|
| 3,164,206 A | 1/1965 | Sharp | |
| 3,316,968 A | 5/1967 | Nettles et al. | |
| 4,085,799 A | 4/1978 | Bousaid et al. | |
| 4,178,993 A | 12/1979 | Richardson et al. | |
| 4,785,880 A | 11/1988 | Ashton | |
| 5,092,983 A | 3/1992 | Eppig et al. | |
| 5,246,072 A | 9/1993 | Frazier, Jr. et al. | |
| 5,251,700 A | 10/1993 | Nelson et al. | |
| 6,302,209 B1 * | 10/2001 | Thompson, Sr. | ... B01F 17/0028 166/305.1 |
| 7,811,541 B2 | 10/2010 | Lefenfeld et al. | |
| 7,946,342 B1 | 5/2011 | Robertson | |
| 8,950,494 B2 | 2/2015 | Nguyen et al. | |
| 9,140,107 B2 * | 9/2015 | Abad | ..... E21B 43/164 |
| 9,267,364 B2 | 2/2016 | Poindexter et al. | |
| 9,657,549 B2 | 5/2017 | Krumrine et al. | |
| 2004/0256104 A1 | 12/2004 | Wilson et al. | |
| 2008/0023203 A1 | 1/2008 | Steiner | |

(Continued)

FOREIGN PATENT DOCUMENTS

EP 2640803 B1 6/2016
JP H05193923 A 8/1993

(Continued)

OTHER PUBLICATIONS

Zhao, W., Oil Recovery Strategies for Thin Heavy Oil Reserves, University of Calgary, Thesis, pp. 28, 32-34, and 133 (Jan. 2016). URL: http://theses.ucalgary.ca/handle/11023/2743 (Retrieved Apr. 29, 2019).

(Continued)

*Primary Examiner* — Silvana C Runyan

(74) *Attorney, Agent, or Firm* — Choate, Hall & Stewart LLP; Charles E. Lyon

(57) ABSTRACT

Methods and systems for recovering hydrocarbon gas from a subterranean reservoir comprising a wellbore, the methods and systems comprising introducing solid carbon dioxide into the wellbore are described within.

19 Claims, 1 Drawing Sheet

(56) References Cited

U.S. PATENT DOCUMENTS

| | | | |
|---|---|---|---|
| 2008/0121391 | A1 | 5/2008 | Durham et al. |
| 2013/0029883 | A1 | 1/2013 | Dismuke et al. |
| 2013/0341023 | A1 | 12/2013 | Krumrine, III et al. |
| 2014/0190694 | A1 | 7/2014 | Liang et al. |
| 2014/0196896 | A1 | 7/2014 | Krumrine et al. |
| 2014/0296185 | A1* | 10/2014 | Jones ............... C09K 8/035 514/75 |
| 2015/0260022 | A1* | 9/2015 | Enis ............... E21B 43/121 166/279 |
| 2015/0300143 | A1 | 10/2015 | Al-Nakhli et al. |
| 2015/0376999 | A1 | 12/2015 | Abad et al. |
| 2016/0245060 | A1 | 8/2016 | Krumrine et al. |
| 2017/0336032 | A1 | 11/2017 | Krumrine, III et al. |
| 2020/0263078 | A1 | 8/2020 | Bataweel et al. |

FOREIGN PATENT DOCUMENTS

| | | |
|---|---|---|
| WO | WO-2008/057219 A2 | 5/2008 |
| WO | WO-2008/118240 A1 | 10/2008 |
| WO | WO-2012/174255 A1 | 12/2012 |
| WO | WO-2015/058164 A1 | 4/2015 |
| WO | WO-2016/174414 A1 | 11/2016 |
| WO | WO-2020/165634 A1 | 8/2020 |
| WO | WO-2020/165635 A1 | 8/2020 |

OTHER PUBLICATIONS

Arachman, F. et al., Liquid Unloading in a Big Bore Completion: A Comparison Among Gas Lift, Intermittent Production, and Installation of Velocity String, SPE Asia Pacific Oil and Gas Conference and Exhibition, Perth, Australia, SPE-88523-MS: 14 pages (Oct. 18-20, 2004).

Bowman, Increasing the Production from Marginal Gas Wells, 2006 SPE International Oilfield Corrosion Symposium, Aberdeen, Scotland, U.S., SPE 100514: 5 pages (May 30, 2016).

Carbon Dioxide, Material Safety Data Sheet, Airgas, 7 pages (Date of Preparation/Revision: Jan. 20, 2012). URL: https://louisville.edu/micronano/files/documents/safety-data-sheets-sds/CO2.pdf (Retrieved Apr. 29, 2019).

Clegg, J.D. et al., Recommendations and Comparisons for Selecting Artificial-Lift Methods, Journal of Petroleum Technology, 1128-1167 SPE-24834-PA. (1993). Discussion of Recommendations and Comparisons for Selecting Artificial-Lift Methods, and Authors' Reply to Discussion, 621-622 (1994).

Krumrine, P.H. et al., Alkali Metal Silicides: A New Material for Heavy-Oil Production Processes, SPE Western North American and Rocky Mountain Joint Regional Meeting, Denver, Colorado, USA, SPE-169490-MS: 14 pages (Apr. 16-18, 2014).

Krumrine, P.H. et al., Investigation of Post CHOPS Enhanced Oil Recovery of Alkali Metal Silicide Technology, SPE Heavy Oil Conference—Canada, Alberta, Canada SPE-170141-MS: 17 pages (Jun. 10-14, 2014).

Liu, Y. et al., Size measurement of dry ice particles produced from liquid carbon dioxide, Journal of Aerosol Science, 48: 1-9, 25 pages (2012).

Masa, V. and Kuba, P., Efficient use of compressed air for dry ice blasting, Journal of Cleaner Production, 111: 76-84 (2016).

Price, B.P. and Gothard, B., Foam-Assisted Lift-Importance of Selection and Application, 2007 SPE Production and Operations Symposium, Oklahoma City, Oklahoma, U.S.A., SPE 106465-MS: 5 pages (Mar. 31-Apr. 2, 2007).

International Search Report for PCT/IB19/53452, 5 pages (dated Oct. 15, 2019).

International Search Report for PCT/IB2019/053451, 5 pages (dated Oct. 4, 2019).

Written Opinion for PCT/IB19/53452, 10 pages (dated Oct. 15, 2019).

Written Opinion for PCT/IB2019/053451, 9 pages (dated Oct. 4, 2019).

* cited by examiner

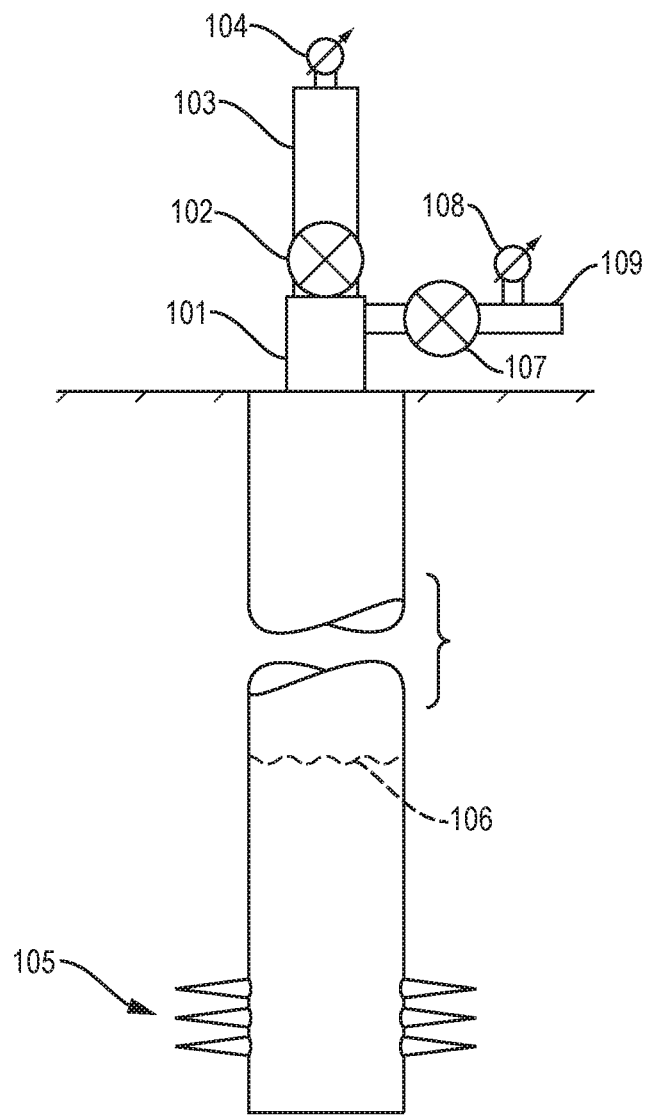

HYDROCARBON WELL DELIQUIFICATION USING DRY ICE

BACKGROUND

Mining of natural gas, such as hydrocarbon gas, is primarily achieved by drilling a hole (a "well") into a subterranean reservoir that contains the hydrocarbon gas. The pressure in the subterranean reservoir is generally greater than the pressure on the surface. Once the subterranean reservoir is tapped, the gas travels naturally through the well to the surface, where the pressure is less.

When hydrocarbon gas travels through the well to the surface, liquids, such as crude oil, condensate, or water, can be pushed along with the gas into the well. Over time, two events generally occur: (1) the rate of hydrocarbon gas exiting the well decreases as the difference in pressure between the reservoir and the surface (in addition to the head pressure) decreases; and (2) liquid condenses and accumulates in the well, forming a "fluid column." The fluid column can form a barrier that prevents hydrocarbon gas from traveling through the well to the surface. This effect is exacerbated as the pressure in the subterranean reservoir decreases and hydrocarbon gases condense. If the fluid cannot be removed, and the gas cannot be lifted out of the well, the well may be prematurely abandoned before the hydrocarbon gas resources in the subterranean reservoir are depleted.

SUMMARY

The present disclosure provides, among other things, methods and systems to address the problem of reduced flow of hydrocarbon gas due to buildup of liquid in a well. In some embodiments, these methods and systems allow for removal of such liquid ("deliquification") without the need for additional drilling or machinery or tubulars.

In some embodiments, the present disclosure provides a method for recovering hydrocarbon gas from a subterranean reservoir comprising a wellbore, where hydrocarbon gas flow from the subterranean reservoir is impeded due to the collection of fluid in the wellbore. In some embodiments, the method comprises introducing solid carbon dioxide into the wellbore, where the solid carbon dioxide sublimates to gaseous carbon dioxide in the presence of the fluid, thereby displacing the fluid from the wellbore and restoring hydrocarbon gas flow from the subterranean reservoir.

In some embodiments, a foaming agent is introduced to the wellbore.

In some embodiments, the foaming agent is a liquid soap or a soap stick.

In some embodiments, the foaming agent is or comprises an alkyl ether sulfate, an α-olefin sulfonate, an alkyl betaine, or an alkyl amidopropyl betaine.

In some embodiments, the solid carbon dioxide is encapsulated in a polymer.

In some embodiments, the polymer is a self-degrading polymer.

In some embodiments, the polymer comprises a polyester, a polylactide, a polyanhydride, or a combination thereof.

In some embodiments, the present disclosure provides a system for introducing solid carbon dioxide into a wellbore and receiving hydrocarbon gas from the wellbore. In some embodiments, the system comprises an insertion chamber; and a wellhead (or christmas tree) comprising a flow line. In some embodiments, the wellhead (or christmas tree) is configured to receive solid carbon dioxide from the insertion chamber and introduce the solid carbon dioxide into the wellbore, and the flow line is configured to receive hydrocarbon gas from the wellbore.

In some embodiments, the insertion chamber comprises a first pressure gauge.

In some embodiments, the flow line comprises a second pressure gauge.

In some embodiments, the wellbore comprises perforated casing.

In some embodiments, the wellhead (or christmas tree) is configured to receive the solid carbon dioxide from the insertion chamber once a pre-determined pressure is measured within the insertion chamber by the first pressure gauge.

In some embodiments, the insertion chamber is configured to be sealed after solid carbon dioxide is inserted in the insertion chamber.

In some embodiments, the present disclosure provides a method of deliquifying a hydrocarbon gas well comprising introducing solid carbon dioxide into the hydrocarbon gas well, where the solid carbon dioxide sublimates in the hydrocarbon gas well.

In some embodiments, the solid carbon dioxide is encapsulated in a polymer.

In some embodiments, the polymer is a self-degrading polymer.

In some embodiments, the polymer comprises a polyester, a polylactide, a polyanhydride, or a combination thereof.

In some embodiments, the solid carbon dioxide is introduced into the subterranean reservoir using the systems described in the present application.

In some embodiments, the solid carbon dioxide is introduced into the hydrocarbon gas well using the systems described in the present application.

In some embodiments, the present disclosure provides a method comprising injecting solid carbon dioxide into a wellbore via an injection pipe and collecting hydrocarbon gas via a collection pipe that is different from the injection pipe.

BRIEF DESCRIPTION OF THE DRAWINGS

FIG. 1 is an illustration of an embodiment of a system for introducing solid carbon dioxide into a wellbore and receiving hydrocarbon gas from the wellbore.

DETAILED DESCRIPTION

In some embodiments, the present disclosure provides, among other things, methods and systems to address the problem of reduced flow of hydrocarbon gas due to build-up of liquid in a well and reduced pressure in a subterranean reservoir or wellbore. In some embodiments, the present disclosure provides methods for removal of such liquid ("deliquification") without the need for additional drilling or machinery or tubulars. Accordingly, in some embodiments, the present disclosure provides a method for recovering hydrocarbon gas from a subterranean reservoir comprising a wellbore, where hydrocarbon gas flow from the subterranean reservoir is impeded due to the collection of fluid in the wellbore. In some embodiments, the method comprises introducing solid carbon dioxide into the subterranean reservoir or wellbore, where the solid carbon dioxide sublimates to gaseous carbon dioxide in the presence of the fluid, thereby displacing the fluid from within the wellbore and restoring hydrocarbon gas flow from the subterranean reservoir.

As used in the present application, the term "hydrocarbon gas" refers to any natural gas or mixture of gasses comprising methane ($CH_4$) or greater level alkanes (for example, ethane, propane, and butane). A hydrocarbon gas can include non-hydrocarbon gasses, such as carbon dioxide, nitrogen, or helium.

As used in the present application, the term "solid carbon dioxide" refers to the solid form of carbon dioxide ($CO_2$), often referred to as "dry ice." Dry ice sublimates at about minus 78.5 degrees Celsius (° C.) under atmospheric pressure, and has a density of about 1.562 grams (g) per cubic centimeter ($cm^3$). At its sublimation point, dry ice has an expansion ratio of about 1 to 554 from solid to gas ("gaseous carbon dioxide").

As used in the present application, the term "subterranean reservoir" refers to any reservoir containing an amount of hydrocarbon gas. The subterranean reservoir exists below the surface of the earth. To reach the subterranean reservoir and extract the hydrocarbon gas, a hole is drilled from the surface to the subterranean reservoir. This hole drilled into the surface that provides access to the subterranean reservoir is referred to as the "well" or "wellbore." Some wellbores are equipped with a support along the wall of the wellbore to stabilize it, referred to as "casings."

As used in the present application, the term "self-degrading polymer" refers to a polymer which can be hydrolyzed. For example, in some embodiments, a self-degrading polymer dissolves upon contact with water. In some embodiments, a self-degrading polymer dissolves with respect to time and/or temperature. Examples of self-degrading polymer are polyester, polylactide or polyanhydride.

The present disclosure provides methods for deliquifying hydrocarbon gas wells, and thereby allows for recovery of hydrocarbon gas from a subterranean reservoir by introducing solid carbon dioxide into the subterranean reservoir comprising a wellbore, where hydrocarbon gas flow from the subterranean reservoir is impeded due to the collection of fluid in the wellbore. In some embodiments, the method comprises introducing solid carbon dioxide into the wellbore, where the solid carbon dioxide sublimates to gaseous carbon dioxide in the presence of the fluid, thereby displacing the fluid from within the wellbore, restoring hydrocarbon gas flow from the subterranean reservoir.

In some embodiments, the subterranean reservoir comprises a well comprising a wellbore. In some embodiments, the solid carbon dioxide is introduced into the wellbore. In some embodiments, the solid carbon dioxide is not introduced into the subterranean reservoir. In some embodiments, a separate pump or entry is used to introduce the solid carbon dioxide directly into the subterranean reservoir. In some embodiments, a separate pump or entry is used to introduce the solid carbon dioxide directly into the wellbore. In some embodiments, the subterranean reservoir comprises a first pipe for introducing solid carbon dioxide into the subterranean reservoir or wellbore, and a second pipe for extraction of hydrocarbon gas.

Once warmed to a temperature greater than about minus 78.5° C. (under atmospheric pressure), solid carbon dioxide will sublime into gaseous carbon dioxide. Without wishing to be bound by any theory, the rapid sublimation of solid carbon dioxide in the wellbore will either cause disruption of the hydrostatic pressure of the fluid column, increase pressure at the bottomhole, or both, such that hydrocarbon gas is displaced towards the surface and the liquid blockage disrupted.

In some instances, however, it may be beneficial to delay the sublimation of solid carbon dioxide. For example, some wellbores are deep, and may require considerable travel time before the solid carbon dioxide comes into contact with a fluid column. Additionally, it is desirable in some instances to have the solid carbon dioxide travel through the fluid column, such that the gaseous carbon dioxide is released in a location that is between the fluid column and the "trapped" hydrocarbon gas. Accordingly, in some embodiments, the solid carbon dioxide may be encapsulated in a polymer. In some embodiments, the polymer may serve as a protective layer that delays release of the gaseous carbon dioxide. In some embodiments, the polymer is a self-degrading polymer. For example, the polymer can degrade upon exposure to specific conditions, such as certain temperatures (for example, the temperatures encountered in a well can reach 60-160° C.), or certain liquids (for example, water). In some embodiments, the polymer can degrade over an extended period of time. For example, in some embodiments, the polymer can degrade over the course of 6 or more hours, 8 or more hours, 10 or more hours, 12 or more hours, 24 or more hours, 36 or more hours, 48 or more hours, 72 or more hours. In some embodiments, the polymer comprises a polyester, a polylactide, a polyanhydride, or a combination thereof. In some embodiments, the polymer is a polyester. In some embodiments, the polymer comprises a polylactide. In some embodiments, the polymer comprises a polyanhydride.

In some embodiments, a foaming agent is introduced to the wellbore in combination with the solid carbon dioxide. In some embodiments, the foaming agent is introduced prior to the solid carbon dioxide. In some embodiments, the foaming agent is introduced simultaneously with the solid carbon dioxide. In some embodiments, the foaming agent is introduced separately from the solid carbon dioxide. In some embodiments, the foaming agent is introduced before the solid carbon dioxide. In some embodiments, the foaming agent is introduced after the solid carbon dioxide.

In some embodiments, the foaming agent is a liquid soap or a soap stick. In some embodiments, the foaming agent is or comprises an alkyl ether sulfate, an α-olefin sulfonate, an alkyl betaine, or an alkyl amidopropyl betaine. In some embodiments, the foaming agent is a liquid soap. In some embodiments, the foaming agent is a soap stick. In some embodiments, the foaming agent is an alkyl ether sulfonate. In some embodiments, the foaming agent is an α-olefin sulfonate. In some embodiments, the foaming agent is an alkyl betaine. In some embodiments, the foaming agent is an alkyl amidopropyl betaine.

In some embodiments, more than one foaming agent is added to the wellbore. In some embodiment, two or more foaming agents are added to the wellbore.

In some embodiments, the foaming agent is solidified (for example, by freezing to a temperature such that the physical state of the foaming agent is solid) prior to administration to the wellbore. In some embodiments, the foaming agent is in the form of a solid pellet, and is introduced into the wellbore as a solid pellet.

In some embodiments, the present disclosure provides a method for deliquifying a hydrocarbon gas well comprising introducing solid carbon dioxide into the hydrocarbon gas well, and subliming the solid carbon dioxide in the hydrocarbon gas well.

A system for receiving hydrocarbon gas from a subterranean reservoir is also provided by the present application. In some embodiments, the present disclosure provides a system for receiving hydrocarbon gas from a wellbore, characterized in that solid carbon dioxide has been introduced into the wellbore.

In some embodiments, the present disclosure provides a system for introducing carbon dioxide into a subterranean reservoir or wellbore. An example system is illustrated in FIG. 1. A wellhead (or christmas tree) 101 is shown fluidly coupled to a wellbore. The wellhead (or christmas tree) 101 is also connected to an insertion chamber 103, which is where the solid carbon dioxide is loaded prior to introduction into the wellbore. A valve 102 is configured to open a passage between the insertion chamber 103 and the wellhead (or christmas tree) 101. The insertion chamber 103 is further configured to have a pressure gauge 104 (a first pressure gauge) that reads the pressure within insertion chamber 103. The wellbore comprises perforated casing 105.

Once the valve 102 is opened, the solid carbon dioxide travels down the wellbore via gravity, eventually reaching the fluid column 106. In some embodiments, the initial speed of travel down the wellbore can be increased. For example, once the solid carbon dioxide is placed in the insertion chamber 103, the chamber can be sealed. The solid carbon dioxide will then begin to sublime in a closed space thereby building up pressure within the insertion chamber 103. As noted, the pressure within the insertion chamber 103 can be monitored via the pressure gauge 104. Once a specific or pre-determined pressure is reached, the valve 102 can be opened, releasing the solid carbon dioxide into the wellbore at a greater speed than when under the sole influence of gravity. Generally, the size of the solid carbon dioxide placed in the insertion chamber 103 will be smaller than the size of the insertion chamber 103 so that there is some room within the insertion chamber 103 for pressure to build as the solid carbon dioxide sublimates.

In some embodiments, as the solid carbon dioxide travels through the wellbore and comes into contact with the fluid column 106. The pressure within the wellbore begins to increase as a result of the sublimation of the solid carbon dioxide in the confined space. The pressure within the wellbore can be monitored using a separate pressure gauge 108 (a second pressure gauge) located on a flow line 109. In some embodiments, the wellbore can be sealed after introduction of the solid carbon dioxide, thereby increasing the pressure within the wellbore. As fluids or gasses rise in the wellbore, or pressure increases, as measured by the pressure gauge 108, gasses or liquids can be released by opening valve 107. Gasses or liquids or both can then travel through flow line 109 for collection or disposal.

Accordingly, in some embodiments, the present disclosure provides a system for introducing solid carbon dioxide into a wellbore and receiving hydrocarbon gas from the wellbore. In some embodiments, the system comprises an insertion chamber and a wellhead (or christmas tree) comprising a flow line. The wellhead (or christmas tree) is configured to receive solid carbon dioxide from the insertion chamber and introduce the solid carbon dioxide into the wellbore. The flow line is configured to receive hydrocarbon gas from the wellbore.

In some embodiments, the insertion chamber further comprises a first pressure gauge.

In some embodiments, the flow line comprises a second pressure gauge.

In some embodiments, the wellhead (or christmas tree) is configured to receive the solid carbon dioxide from the insertion chamber once a pre-determined pressure is measured within the insertion chamber by the first pressure gauge. In some embodiments, the pre-determined pressure is a pressure greater than atmospheric pressure, indicating that some of the solid carbon dioxide has sublimated to gaseous carbon dioxide. In some embodiments, the pre-determined pressure is a pressure between 1 and 2000 pounds per square inch (psi). In some embodiments, the pre-determined pressure is between 1000 and 2000 psi.

In some embodiments, the insertion chamber is sealed after the solid carbon dioxide is inserted into the insertion chamber.

In some embodiments, any of the methods for introducing solid carbon dioxide into a wellbore can be performed using any system described within.

The methods and systems described in the present application provide deliquification technologies for wellbores. Without being bound by theory, it is proposed that the systems and methods described in the present application deliquify a wellbore or subterranean reservoir due, in part, to the generation of carbon dioxide ($CO_2$) gas due to sublimation of the solid carbon dioxide. The $CO_2$ gas disrupts the hydrostatic force present in the wellbore, allowing hydrocarbon gasses to escape and be collected. Said hydrostatic forces are disrupted due, in part, to the increase in pressure provided by sublimation of solid carbon dioxide to $CO_2$ gas.

Table 1 illustrates the volume of $CO_2$ released due to sublimation of solid carbon dioxide. In particular, Table 1 illustrates that 44 grams (g) of solid carbon dioxide releases about 22 liters (L) of $CO_2$ gas. In particular, 22.70 L of $CO_2$ gas is calculated at standard temperature and pressure (273.15 Kelvin (K), 101.325 kilopascals (kPa), "STP"). The volume of $CO_2$ generated is determined using Avogadro's Law to calculate molecular volume:

$$V_m = \frac{V}{n} = \frac{RT}{P} = \frac{(8.314 \text{ Jmol}^{-1}\text{K}^{-1})(273.15 \text{ K})}{101.325 \text{ kPa}} = 22.41 \text{ liters/mol}$$

where $V_m$ is the molar volume, V is volume (in liters), n is the number of moles of the gas, R is the ideal gas constant (measured in joules/mol*K ($\text{Jmol}^{-1}\text{K}^{-1}$), T is temperature (in Kelvins), and P is pressure (in kilopascals).

TABLE 1

| | | |
|---|---|---|
| Molar mass of $CO_2$ | 44.01 | g/mol |
| Weight of solid carbon dioxide | 44 | g |
| Nos. of moles of $CO_2$ | 0.9998 | mols |
| T (at STP) | 273.15 | K |
| P (at STP) | 101.325 | kPa |
| Ideal gas volume | 22.71 | L/mol |
| Volume of $CO_2$ | 22.70 | L |

Using the data derived from Table 1, Table 2 illustrates the change in pressure due to introduction of $CO_2$ gas into a theoretical system, where the original wellhead pressure is 500 psi, and the average fluid temperature is 338.71 K. Table 2 shows that 100 kilograms (kg) of solid carbon dioxide added to a wellbore will generate an increase of 567.99 psi, providing a total pressure of 1067.99 psi at the wellhead. The increase in pressure is sufficient to disrupt hydrostatic forces.

TABLE 2

| | | |
|---|---|---|
| Outer diameter of tubing | 4.5 | inches |
| Inner diameter of tubing | 3.958 | inches |
| Capacity | 0.0152 | barrels oil/feet (bbl/ft) |
| Length of tubing | 1000 | ft |
| Fluid level from bottom | 50 | % |
| Volume of fluid | 1208.303 | L |
| Volume of empty space | 1208.303 | L |
| Density of solid carbon dioxide | 1.562 | kg/L |

TABLE 2-continued

| | | |
|---|---|---|
| Volume solid carbon dioxide in Chamber | 64 | L |
| Weight of solid carbon dioxide in Chamber | 100 | kg |
| Molecular wt of solid carbon dioxide | 44 | g/mol |
| Moles of solid carbon dioxide | 2272.7 | mols |
| Original wellhead pressure | 500 | psi |
| Avg. fluid temperature | 338.71 | K |
| Volume of $CO_2$ sublimated | 1634.8 | L |
| Increase in pressure | 567.99 | psi |
| Total wellhead pressure | 1067.99 | psi |

A table providing specific weight amounts of $CO_2$ gas at various temperatures, pressures, and physical states (for example, liquid or gas) can be found at http://www.energy.psu.edu/tools/CO2-EOS/ (last accessed Jan. 17, 2019).

In some embodiments, about 100 kg of solid carbon dioxide is introduced into the wellbore. In some embodiments, the solid carbon dioxide is introduced batchwise. In some embodiments, about 100 kg of solid carbon dioxide is introduced into the wellbore batchwise. In some embodiments, about 100 kg of solid carbon dioxide is introduced into the wellbore in 10 kg batches. In some embodiments, 10 kg batches of solid carbon dioxide are delivered until the wellbore is deliquified.

The foregoing has been a description of certain non-limiting embodiments of the subject matter described within. Accordingly, it is to be understood that the embodiments described in this specification are merely illustrative of the subject matter reported within. Reference to details of the illustrated embodiments is not intended to limit the scope of the claims, which themselves recite those features regarded as essential.

It is contemplated that systems and methods of the claimed subject matter encompass variations and adaptations developed using information from the embodiments described within. Adaptation, modification, or both of the systems and methods described within may be performed by those of ordinary skill in the relevant art.

Throughout the description, where systems are described as having, including, or comprising specific components, or where methods are described as having, including, or comprising specific steps, it is contemplated that, additionally, there are systems encompassed by the present subject matter that consist essentially of, or consist of, the recited components, and that there are methods encompassed by the present subject matter that consist essentially of, or consist of, the recited processing steps.

It should be understood that the order of steps or order for performing certain action is immaterial so long as any embodiment of the subject matter described within remains operable. Moreover, two or more steps or actions may be conducted simultaneously.

We claim:

1. A method for recovering hydrocarbon gas from a subterranean reservoir comprising a wellbore, where hydrocarbon gas flow from the subterranean reservoir is impeded due to a collection of fluid in the wellbore, the method comprising:
    introducing solid carbon dioxide into the wellbore, where the solid carbon dioxide sublimates to gaseous carbon dioxide in the presence of the fluid, thereby displacing the fluid from the wellbore and restoring hydrocarbon gas flow from the subterranean reservoir; and
    recovering hydrocarbon gas from the subterranean reservoir;
    where the solid carbon dioxide is encapsulated in a polymer.

2. The method of claim 1, where a foaming agent is introduced to the wellbore.

3. The method of claim 2, where the foaming agent is a liquid soap or a soap stick.

4. The method of claim 2, where the foaming agent is or comprises an alkyl ether sulfate, an a-olefin sulfonate, an alkyl betaine, or an alkyl amidopropyl betaine.

5. The method of claim 1, where the polymer is a self-degrading polymer.

6. The method of claim 1, where the polymer comprises a polyester, a polylactide, a polyanhydride, or a combination thereof.

7. The method of claim 1, where the solid carbon dioxide is introduced into the wellbore using a system, wherein the system is fluidly coupled to the wellbore and comprises:
    an insertion chamber; and
    a wellhead (or christmas tree) comprising a flow line, where the wellhead (or christmas tree) is configured to receive solid carbon dioxide from the insertion chamber and introduce the solid carbon dioxide into the wellbore, and the flow line is configured to receive hydrocarbon gas from the wellbore.

8. The method of claim 7, where the insertion chamber comprises a first pressure gauge.

9. The method of claim 8, where the flow line comprises a second pressure gauge.

10. The method of claim 8, where the wellhead (or christmas tree) is configured to receive the solid carbon dioxide from the insertion chamber once a pre-determined pressure is measured within the insertion chamber by the first pressure gauge.

11. The method of claim 7, where the insertion chamber is configured to be sealed after solid carbon dioxide is inserted in the insertion chamber.

12. A method of deliquifying a hydrocarbon gas well comprising introducing solid carbon dioxide into a hydrocarbon gas well; and
    subliming the solid carbon dioxide in the hydrocarbon gas well to thereby deliquify the hydrocarbon gas well,
    where the solid carbon dioxide is encapsulated in a polymer.

13. The method of claim 12, where the polymer is a self-degrading polymer.

14. The method of claim 12, where the polymer comprises a polyester, a polylactide, a polyanhydride, or a combination thereof.

15. The method of claim 13, where the solid carbon dioxide is introduced into the hydrocarbon gas well using a system, wherein the system is fluidly coupled to the wellbore and comprises:
    an insertion chamber; and
    a wellhead (or christmas tree) comprising a flow line, where the wellhead (or christmas tree) is configured to receive solid carbon dioxide from the insertion chamber and introduce the solid carbon dioxide into the wellbore, and the flow line is configured to receive hydrocarbon gas from the wellbore.

16. The method of claim 15, where the insertion chamber comprises a first pressure gauge.

17. The method of claim 16, where the flow line comprises a second pressure gauge.

18. The method of claim 16, where the wellhead (or christmas tree) is configured to receive the solid carbon dioxide from the insertion chamber once a pre-determined pressure is measured within the insertion chamber by the first pressure gauge.

19. The method of claim 15, where the insertion chamber is configured to be sealed after solid carbon dioxide is inserted in the insertion chamber.

\* \* \* \* \*